(12) United States Patent
Kuramitsu et al.

(10) Patent No.: US 12,515,702 B2
(45) Date of Patent: Jan. 6, 2026

(54) MOVING OBJECT CONTROL SYSTEM, CONTROL METHOD THEREFOR, AND RECORDING MEDIUM

(71) Applicant: HONDA MOTOR CO., LTD., Tokyo (JP)

(72) Inventors: Yunosuke Kuramitsu, Wako (JP); Koki Aizawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 252 days.

(21) Appl. No.: 18/240,436

(22) Filed: Aug. 31, 2023

(65) Prior Publication Data
US 2024/0075954 A1 Mar. 7, 2024

(30) Foreign Application Priority Data

Sep. 6, 2022 (JP) .................................. 2022-141499

(51) Int. Cl.
*B60W 60/00* (2020.01)
*B60W 30/09* (2012.01)
*B60W 30/095* (2012.01)

(52) U.S. Cl.
CPC ........ *B60W 60/0015* (2020.02); *B60W 30/09* (2013.01); *B60W 30/0953* (2013.01); *B60W 2520/06* (2013.01); *B60W 2554/80* (2020.02)

(58) Field of Classification Search
CPC ............... B60W 30/09; B60W 30/095; B60W 30/0956; B60W 60/0011; B60W 60/0015
See application file for complete search history.

(56) References Cited

U.S. PATENT DOCUMENTS

| | | | |
|---|---|---|---|
| 2018/0101179 A1 | 4/2018 | Louey et al. | |
| 2019/0294175 A1 | 9/2019 | Pajevic et al. | |
| 2020/0317192 A1* | 10/2020 | Awane | B62D 15/025 |
| 2022/0017118 A1* | 1/2022 | Shinomoto | B60W 30/0953 |
| 2022/0234577 A1* | 7/2022 | Baba | G06V 20/58 |
| 2025/0033637 A1* | 1/2025 | Huskic | B60W 10/18 |

FOREIGN PATENT DOCUMENTS

| | | |
|---|---|---|
| JP | 2016-136319 A | 7/2016 |
| JP | 2016-212668 A | 12/2016 |
| JP | 2022-013243 A | 1/2022 |

OTHER PUBLICATIONS

Japanese Office Action for Japanese Application No. 2022-141499 mailed Aug. 18, 2025 (partially translated).

* cited by examiner

*Primary Examiner* — Anshul Sood
(74) *Attorney, Agent, or Firm* — Thomas | Horstemeyer, LLP

(57) ABSTRACT

A moving object control system that controls an operation of a moving object including a drive wheel and a driven wheel. The moving object control system generates a trajectory along which the moving object travels based on a target position and trajectories that are generatable from velocities and angular velocities of the moving object that satisfy a predetermined constraint condition and controls traveling of the moving object in accordance with the generated trajectory. The predetermined constraint condition includes a constraint determined from a travelable velocity of the moving object, a constraint determined from an acceleration at which the moving object is capable of accelerating, and a constraint depending on an angle of the driven wheel.

16 Claims, 6 Drawing Sheets

MOVING OBJECT CONTROL SYSTEM, CONTROL METHOD THEREFOR, AND RECORDING MEDIUM

CROSS-REFERENCE TO RELATED APPLICATION(S)

This application claims priority to and the benefit of Japanese Patent Application No. 2022-141499, filed Sep. 6, 2022, the entire disclosure of which is incorporated herein by reference.

BACKGROUND OF THE INVENTION

Field of the Invention

The present invention relates to a moving object control system, a control method therefor, and a recording medium.

Description of the Related Art

In these years, there is an increasing demand for ultra-compact moving objects (micro mobility vehicles) for supporting movements of people in small regions. Micro mobility vehicles include vehicles each having a riding capacity of one person or so, vehicles that travel carrying baggage along with a person, instead of carrying the person, and the like. The micro mobility vehicles require an autonomous movement technology in free spaces such as sidewalks in addition to an automated driving technology for traveling on roadways in order to enable traveling in both moving regions of automobiles and moving regions of pedestrians. There is a case where a micro mobility vehicle is configured by, for example, a relatively simple drive system such as a two-wheel differential in order to achieve a small size as a moving object and traveling with a small turn.

Japanese Patent Laid-Open No. 2016-136319 proposes a technology in which, in an autonomous moving truck including two drive wheels and a caster, a turning angle of the caster with respect to an advancing direction is obtained based on an orientation of the caster and a velocity command value with respect to the advancing direction of the truck, and the velocity command value is limited when the turning angle reaches a predetermined turning angle.

Meanwhile, in a case where a micro mobility vehicle has a drive wheel and a driven wheel constituting a two-wheel differential, an angle of the driven wheel affects the motion of the micro mobility vehicle to deteriorate followability to a target trajectory and ride comfort in some cases. Therefore, how to consider the angle of the driven wheel in a control algorithm for causing the micro mobility vehicle to travel to a target position is a problem. In this regard, in Japanese Patent Laid-Open No. 2016-136319, it is merely considered to limit the velocity command value when the turning angle becomes equal to or more than the predetermined value.

SUMMARY OF THE INVENTION

The present invention has been made in view of the above problem, and an object thereof is to achieve a technology that enables generation of a traveling trajectory of a moving object having a drive wheel and a driven wheel while appropriately considering an angle of the driven wheel.

In order to solve the aforementioned issues, one aspect of the present disclosure provides a moving object control system that controls an operation of a moving object including a drive wheel and a driven wheel, the moving object control system comprising: a generation unit configured to generate a trajectory along which the moving object travels based on a target position and trajectories that are generatable from velocities and angular velocities of the moving object that satisfy a predetermined constraint condition; and a control unit configured to control traveling of the moving object in accordance with the generated trajectory, wherein the predetermined constraint condition includes a constraint determined from a travelable velocity of the moving object, a constraint determined from an acceleration at which the moving object is capable of accelerating, and a constraint depending on an angle of the driven wheel.

Another aspect of the present disclosure provides, a control method for a moving object control system that controls an operation of a moving object including a drive wheel and a driven wheel, the control method comprising: generating a trajectory along which the moving object travels based on a target position and trajectories that are generatable from velocities and angular velocities of the moving object that satisfy a predetermined constraint condition; and controlling traveling of the moving object in accordance with the generated trajectory, wherein the predetermined constraint condition includes a constraint on a velocity and an angular velocity of the moving object determined from a travelable velocity of the moving object, a constraint on a velocity and an angular velocity of the moving object determined from an acceleration at which the moving object is capable of accelerating, and a constraint on a velocity and an angular velocity of the moving object depending on an angle of the driven wheel.

Still another aspect of the present disclosure provides a recording medium storing a program for causing a computer to function as each unit of a moving object control system that controls an operation of a moving object including a drive wheel and a driven wheel, the moving object control system including: a generation unit configured to generate a trajectory along which the moving object travels based on a target position and trajectories that are generatable from velocities and angular velocities of the moving object that satisfy a predetermined constraint condition; and a control unit configured to control traveling of the moving object in accordance with the generated trajectory, wherein the predetermined constraint condition includes a constraint determined from a travelable velocity of the moving object, a constraint determined from an acceleration at which the moving object is capable of accelerating, and a constraint depending on an angle of the driven wheel.

According to the present invention, it is possible to generate the traveling trajectory of the moving object having the drive wheel and the driven wheel while appropriately considering the angle of the driven wheel.

DESCRIPTION OF THE EMBODIMENTS

Figure 1A:
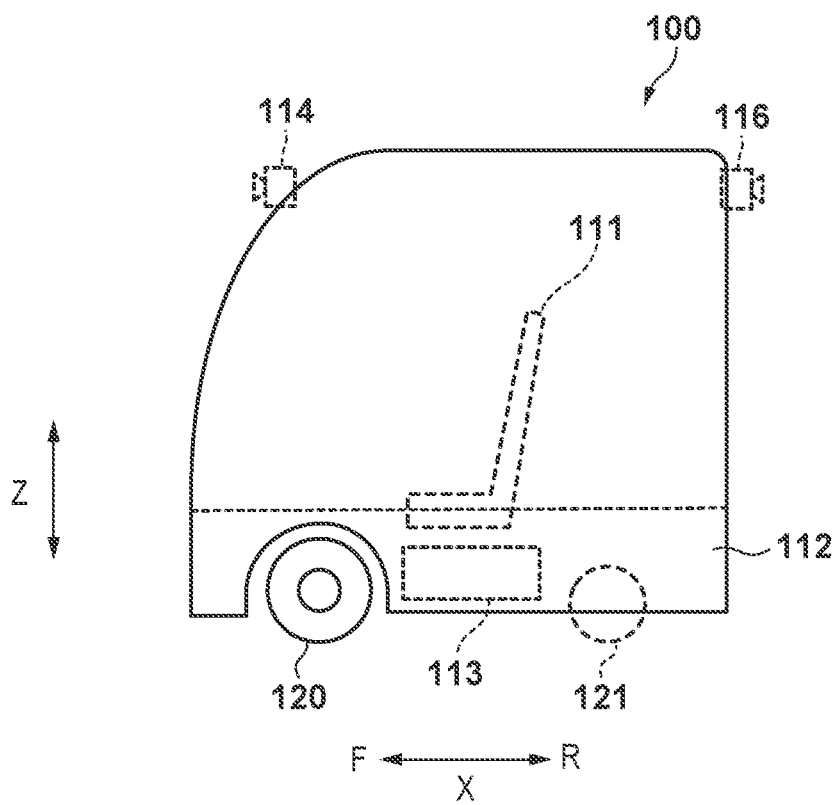
FIGS. 1A and 1B are diagrams illustrating a configuration example of a moving object according to an embodiment of the present invention.

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

In the following embodiment, as an example of a moving object that is a micro mobility vehicle, an ultra-compact electric vehicle having a riding capacity of one person or so will be described as an example. However, the micro mobility vehicles may include any vehicle that travels carrying baggage along with a person, instead of carrying the person. Further, the present embodiment is not limited to this example, and is applicable to any moving object other than the electric vehicle as long as the moving object has a driven wheel. Although a case where there is one driven wheel will be described as an example in the following description, the number of driven wheels is not limited to one and may be two or more.

In moving objects such as micro mobility vehicles described above, it is advantageous if autonomous traveling is achieved in consideration of riding of a person, frequent changes in target position, and non-use of a high-precision map. In a case where a person rides on a moving object, there is a possibility of giving uneasiness to the person riding on the moving object if a traveling trajectory that does not consider an unnatural traveling trajectory or ride comfort is selected, which is different from an unmanned robot for delivery. Further, in a case where an instruction for a target position is received by the person riding on the vehicle, a response to a change in the target position is required. Furthermore, traveling is not limited to a specific determined route, and it is necessary to appropriately travel in a region where a high-precision map is not prepared in order to be capable of traveling in both moving regions of automobiles and moving regions of pedestrians.

A moving object 100 according to the present embodiment autonomously travels toward a target position that can be changed without using a high-precision map. Since the autonomous traveling is possible without using the high-precision map, a region where the moving object 100 can travel is identified using information recognized from an output of a detection unit to be described later. As will be described later, the moving object 100 generates a grid map representing a travelable region and a non-travelable region of the moving object 100, and uses the grid map to generate a traveling trajectory of the moving object 100. As will be described in detail later, the moving object 100 generates a trajectory along which the moving object travels in consideration of an angle of a driven wheel in a dynamic window approach (DWA).

<Configuration of Moving Object>

Figure 1B:
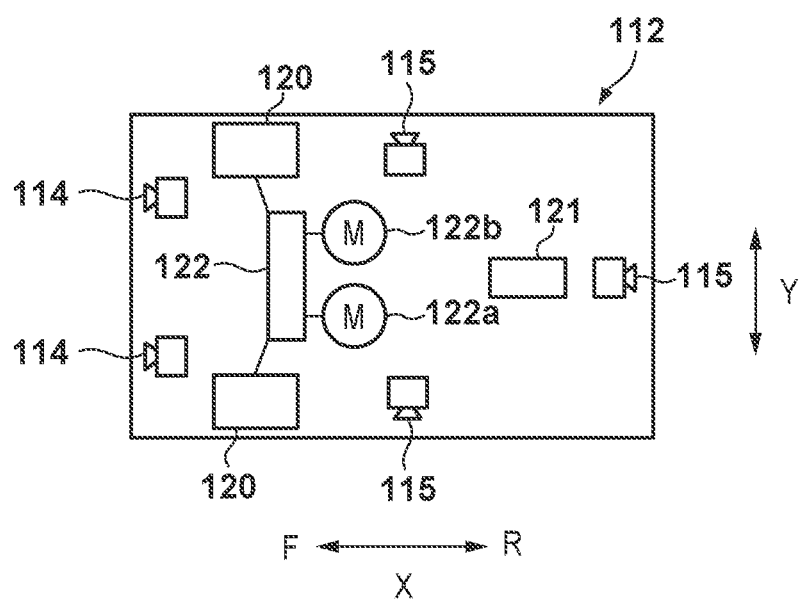

A configuration of the moving object 100 will be described with reference to FIGS. 1A and 1B. FIG. 1A illustrates a side surface of the moving object 100 according to the present embodiment, and FIG. 1B illustrates an internal configuration of the moving object 100. In the drawing, an arrow X indicates a front-and-rear direction of the moving object 100, and F indicates the front, and R indicates the rear. Arrows Y and Z respectively indicate a width direction (a left-and-right direction) and an up-and-down direction of the moving object 100.

The moving object 100 is an electric autonomous vehicle including a traveling unit 112 and using a battery 113 as a main power supply. The battery 113 is, for example, a secondary battery such as a lithium ion battery, and the moving object 100 autonomously travels by the traveling unit 112 with electric power supplied from the battery 113. The traveling unit 112 is in a form of a three-wheeled vehicle including a pair of left and right drive wheels 120, which are front wheels, and one driven wheel 121 which is a rear wheel. Note that the traveling unit 112 may have another form such as a form of a four-wheeled vehicle. The moving object 100 includes, for example, a single seat 111.

The traveling unit 112 includes a drive mechanism 122. The drive mechanism 122 is a mechanism that rotates the corresponding drive wheels 120 with motors 122a and 122b as drive sources. The drive mechanism 122 is capable of moving the moving object 100 forward or backward by rotating each of the drive wheels 120. Further, the drive mechanism 122 is also capable of changing an advancing direction of the moving object 100 by making a difference in rotation between the motors 122a and 122b. The traveling unit 112 includes the driven wheel 121. The driven wheel is capable of making a turn with Z direction as a rotation axis.

The moving object 100 includes detection units 114 to 116, each of which detects a target object in the surroundings of the moving object 100. The detection units 114 to 116 form an external sensor group that monitors the periphery of the moving object 100. In the case of the present embodiment, each of the detection units 114 to 116 is an imaging device that captures an image in the surroundings of the moving object 100, and includes, for example, an optical system such as a lens and an image sensor. However, instead of or in addition to the imaging device, a radar or a light detection and ranging (LIDAR) can also be used.

For example, two detection units 114 are disposed in a front portion of the moving object 100 to be spaced apart from each other in Y direction, and are mainly used to detect a target object in front of the moving object 100. The detection units 115 are respectively disposed on a left side portion and a right side portion of the moving object 100, and are mainly used to detect a target object on sides of the moving object 100. The detection unit 116 is disposed in a rear portion of the moving object 100, and is mainly used to detect a target object at the rear of the moving object 100.

Figure 2:
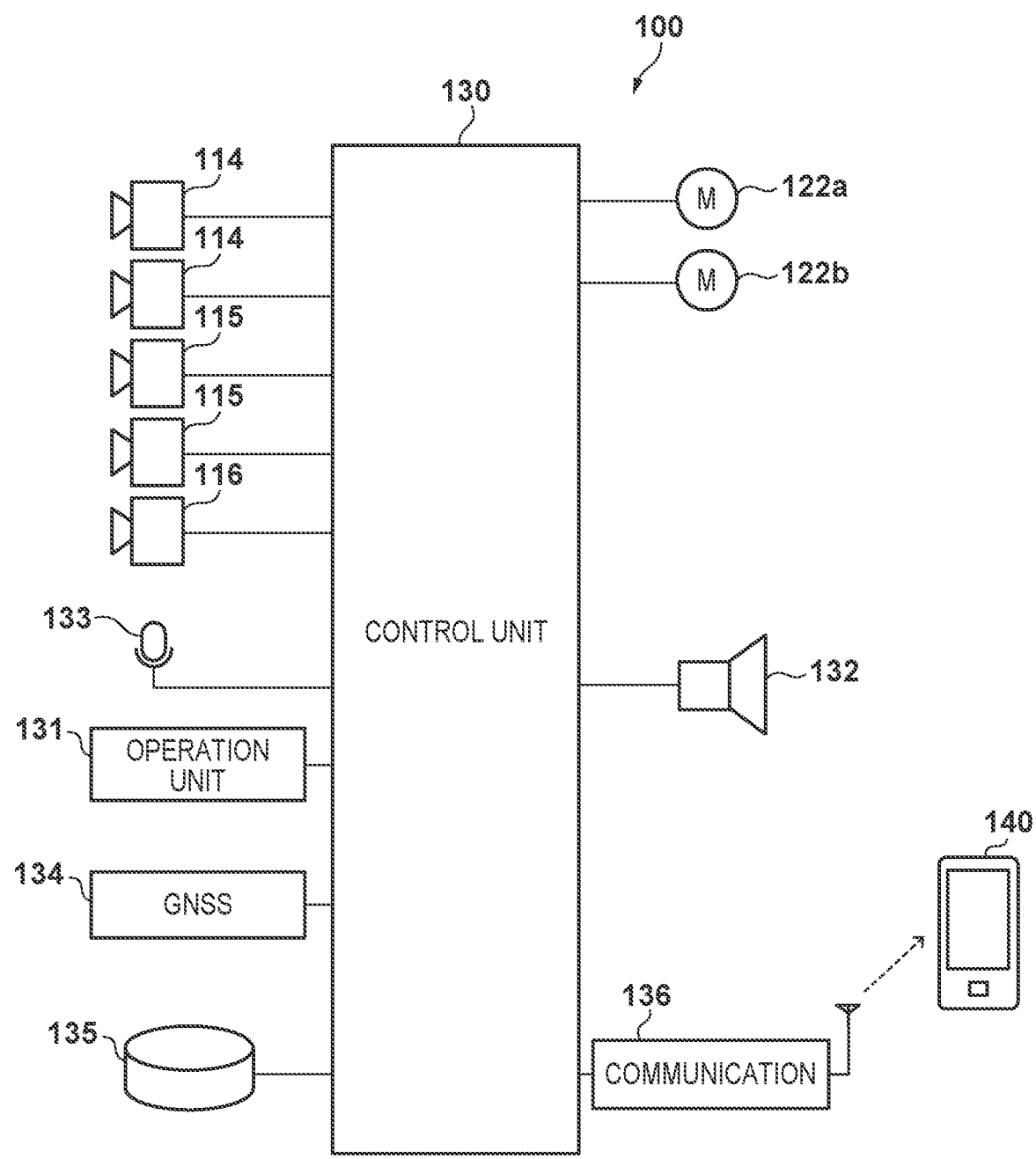
FIG. 2 is a block diagram illustrating a configuration example of a control system of the moving object according to the embodiment.

FIG. 2 is a block diagram of a control system of the moving object 100. The moving object 100 includes a control unit (ECU) 130. The control unit 130 includes one or more processors each represented by a CPU, a memory device such as a semiconductor memory, an interface with an external device, and the like. The memory device stores programs executed by the processor, data used by the processor for processing, and the like. A plurality of sets of the processor, the memory device, and the interface may be provided for an individual function of the moving object 100 to be capable of communicating with each other.

The control unit 130 acquires outputs (for example, image information) from the detection units 114 to 116, input information into an operation unit 131, voice information that has been input from a voice input device 133, and the like, and performs corresponding processing. The control unit 130 performs control of the motors 122*a* and 122*b* (travel control of the traveling unit 112) and display control of a display panel included in the operation unit 131, gives a notification to an occupant of the moving object 100 by sounds, and outputs information. The control unit 130 may perform processing using a machine learning model for image recognition (for example, a deep neural network) on the outputs from the detection units 114 to 116. Furthermore, the control unit 130 may execute processing using a machine learning model for voice recognition (for example, a deep neural network) on the output from the voice input device 133.

The voice input device 133 includes, for example, a microphone, and collects a voice of the occupant of the moving object 100. The control unit 130 can recognize the input voice and execute processing corresponding to the recognized input voice. A global navigation satellite system (GNSS) sensor 34 receives a GNSS signal, and detects a current location of the moving object 100.

A storage device 135 includes a recording medium that stores various types of data. The storage device 135 may also store a program to be executed by the processor, data for use in processing by the processor, and the like. The storage device 135 may store various parameters (for example, learned parameters of a deep neural network, hyperparameters, and the like) of a machine learning model for voice recognition or image recognition executed by the control unit 130.

A communication device 136 is a communication device capable of communicating with an external device (for example, a communication terminal 140 owned by a user) via wireless communication, such as Wi-Fi or 5th generation mobile communication.

Figure 3:
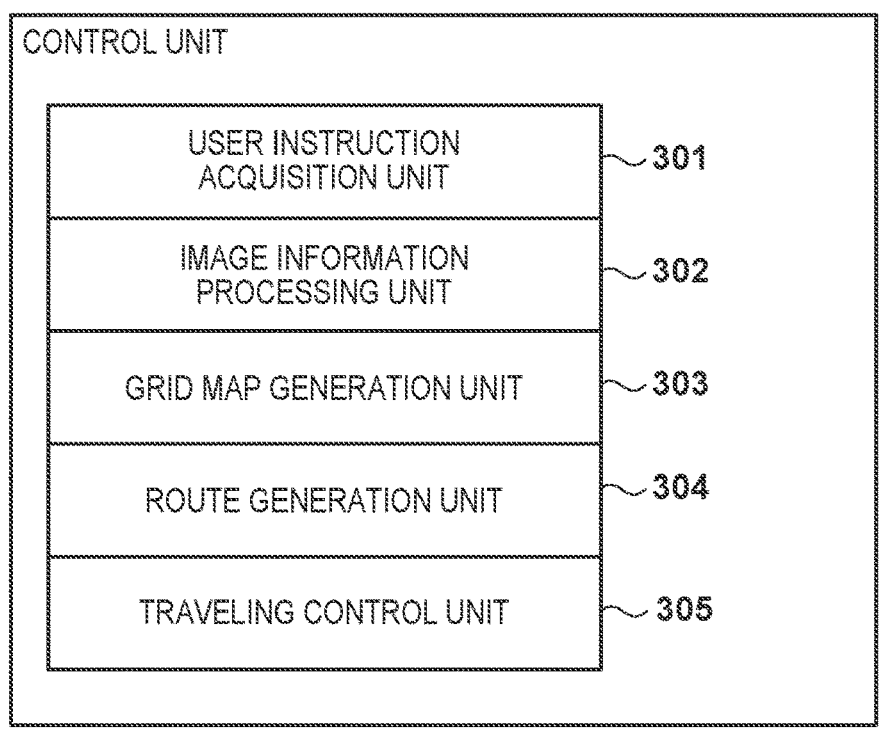
FIG. 3 is a block diagram illustrating a functional configuration example related to a control unit of the moving object according to the embodiment.

Next, a functional configuration example according to the control unit 130 will be described with reference to FIG. 3. A user instruction acquisition unit 301 acquires a user instruction to be input via the operation unit 131 or the voice input device 133. The user instruction includes designation of a final target position at which the moving object 100 should arrive. The final target position may be a position of a target object designated by an utterance voice among the target objects recognized in the image output by the detection units 114 to 116. Further, the user instruction may include a change instruction for the traveling trajectory, such as a right turn or a left turn during traveling of the moving object 100.

An image information processing unit 302 recognizes positions, shapes, and the like of a traveling path and an obstacle based on the outputs (for example, image information) of the detection units 114 to 116. The recognition of the positions, shapes, and the like of the traveling path and the obstacle in front of the moving object 100 is performed, for example, by obtaining a distance from the moving object 100 using a stereo image obtained from the two detection units 114. In order to recognize the traveling path and the obstacle, a machine learning model (for example, a deep neural network) for image recognition learned in advance may be used with a monocular image or a stereo image.

Figure 4:
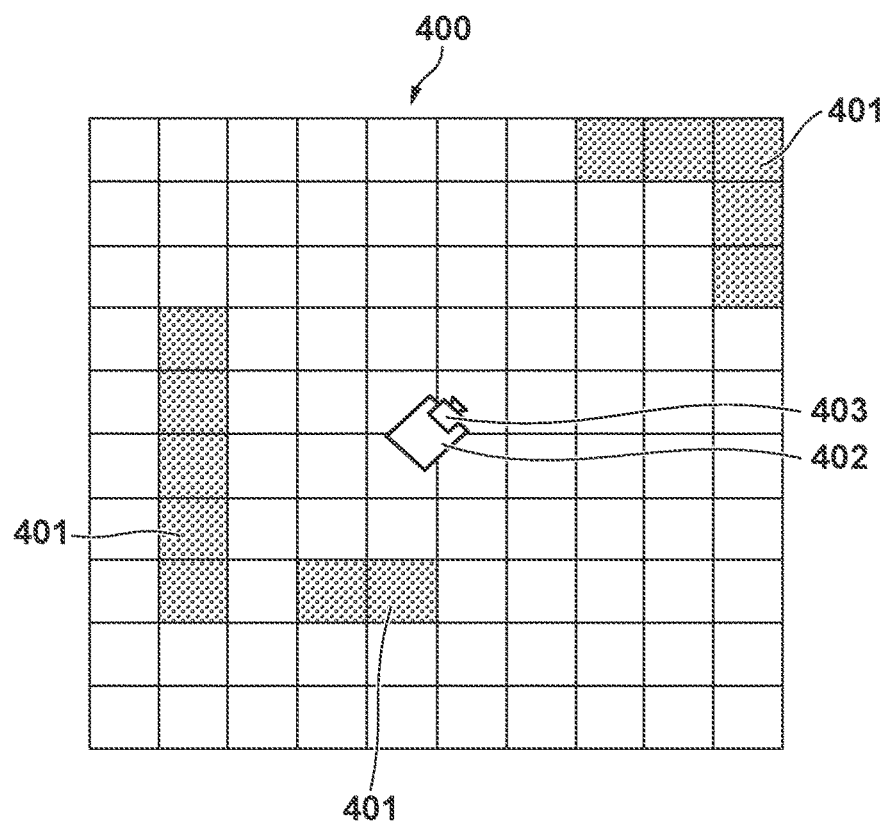
FIG. 4 is a view schematically illustrating an example of a grid map according to the embodiment.

A grid map generation unit 303 generates a grid map representing a travelable region and a non-travelable region of the moving object 100 in the vicinity of the moving object 100 based on the positions, shapes, and the like of the traveling path and the obstacle recognized by the image information processing unit 302. FIG. 4 schematically illustrates an example of the grid map according to the present embodiment. The example illustrated in FIG. 4 schematically illustrates a state in which a detection unit 403 captures an image in front of a moving object 402 and generates a grid map 400 indicating non-travelable regions 401 indicating the presence of obstacles and the other regions (travelable regions).

The grid map generation unit 303 shifts the grid map 400 such that the moving object is located at the center of the grid map in accordance with movement of the moving object 100. The grid map generation unit 303 assigns the non-travelable region 401 to a corresponding grid in the grid map 400 according to a recognition result of the image information processing unit 302. The grid map generation unit 303 generates the grid map by adding the non-travelable region 401 along with the movement of the moving object 100.

The route generation unit 304 executes trajectory generation processing to be described later and generates a trajectory (traveling trajectory) along which the moving object 100 travels. The route generation unit 304 uses, for example, a dynamic window approach (DWA) to generate the traveling trajectory. The DWA can generate the trajectory along which the moving object 100 travels in consideration of constraints such as kinematics and an acceleration. Note that the traveling trajectory generated by the route generation unit 304 of the present embodiment is sometimes referred to as a local route with respect to a global route to be described later. A global route is a route for heading toward a target position that is longer than the trajectory (that is, the local route) generated using the DWA. The route generation unit 304 can generate the trajectory based on the target position by referring to the global route.

In the case of using the DWA, for example, the route generation unit 304 determines combinations of a velocity and an angular velocity of the moving object that satisfies constraint conditions to be described below, and generate trajectories for the respective combinations. Then, the route generation unit 304 puts a plurality of the generated trajectories into a cost function, and selects a trajectory with the lowest cost. Alternatively, the route generation unit 304 may select a trajectory closest to the target position among the plurality of generated trajectories.

Figure 5:
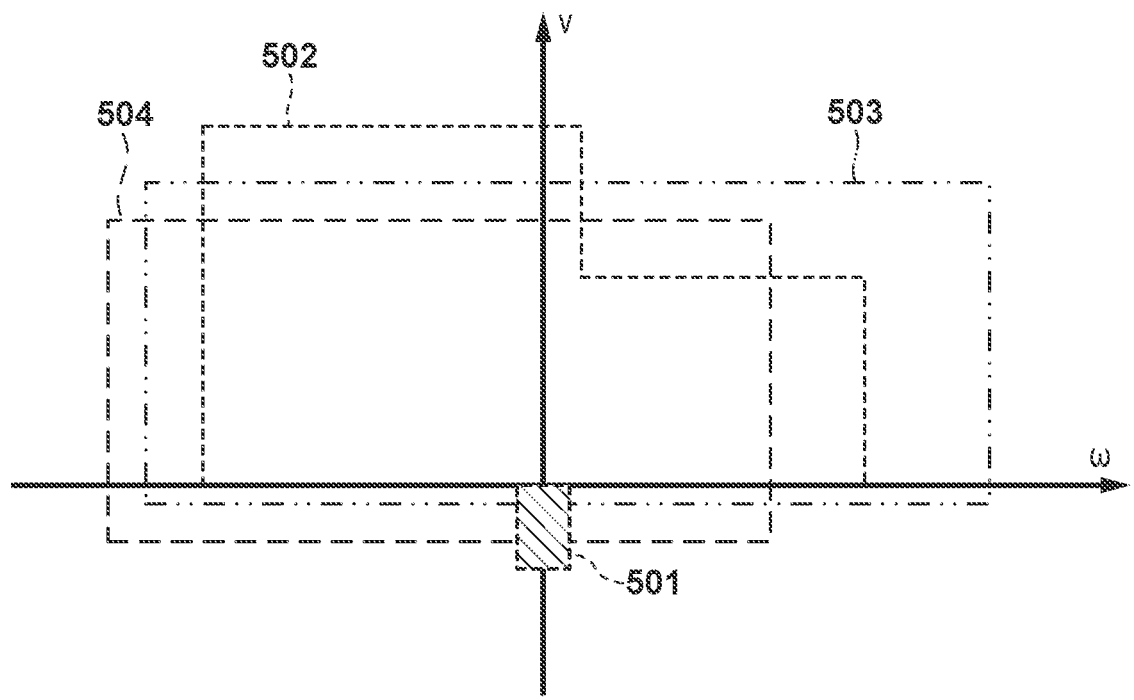
FIG. 5 is a view schematically illustrating a range (window) satisfying constraint conditions of a velocity and an angular velocity of the moving object according to the embodiment.

FIG. 5 schematically illustrates ranges (windows) satisfying constraint conditions of the velocity and the angular velocity of the moving object used by the route generation unit 304 according to the present embodiment. A horizontal axis ω in FIG. 5 represents the angular velocity of the moving object, and a vertical axis v in FIG. 5 represents the velocity of the moving object. A moving object 501 is schematically illustrated at the origin. An obstacle window 502 indicates a range of the velocity and the angular velocity for preventing the moving object 100 from colliding with an obstacle. The velocity constraint window 503 indicates a range of the velocity of the moving object determined from a travelable velocity of the moving object 100. The acceleration constraint window 504 indicates a range of the velocity and the angular velocity of the moving object determined from an acceleration (limit acceleration) at which the moving object 100 can accelerate. In the DWA, combinations of the velocity and the angular velocity included in all the windows of the obstacle window 502, the velocity constraint window 503, and the acceleration constraint window 504 are the velocity and the angular velocity that satisfy all the three constraint conditions.

Figure 6:
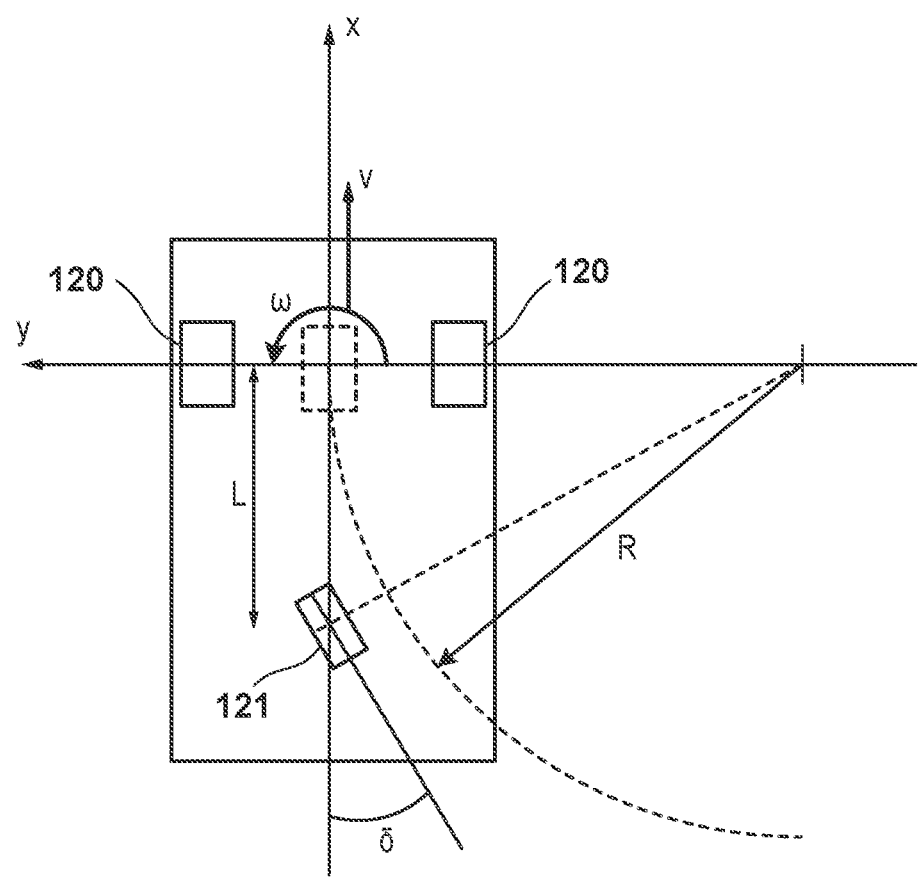
FIG. 6 is a view for describing modeling of the moving object according to the embodiment.

The route generation unit 304 uses the constraint conditions of the velocity and the angular velocity according to an angle of the driven wheel together with the constraint conditions described above. FIG. 6 illustrates a view obtained by modeling the moving object including two drive wheels 120 and one driven wheel 121. In FIG. 6, the velocity in the advancing direction is represented by v, the angular velocity is represented by ω, a length from an axle of the drive wheels to a center position of the driven wheel is represented by L, and a radius of curvature is represented by R. An angle formed by an angle of the driven wheel and the advancing direction of the moving object (also referred to as an angle δ of the driven wheel) can be estimated according to the following Formula (1). That is, the route generation unit 304 can estimate the angle of the driven wheel based on the velocity of the moving object, the angular velocity of the moving object, and a distance of the driven wheel from the axle of the drive wheels.

[Expression 1]

$$\delta = -\arctan\left(\frac{L\omega}{v}\right) \quad (1)$$

Figure 7A:
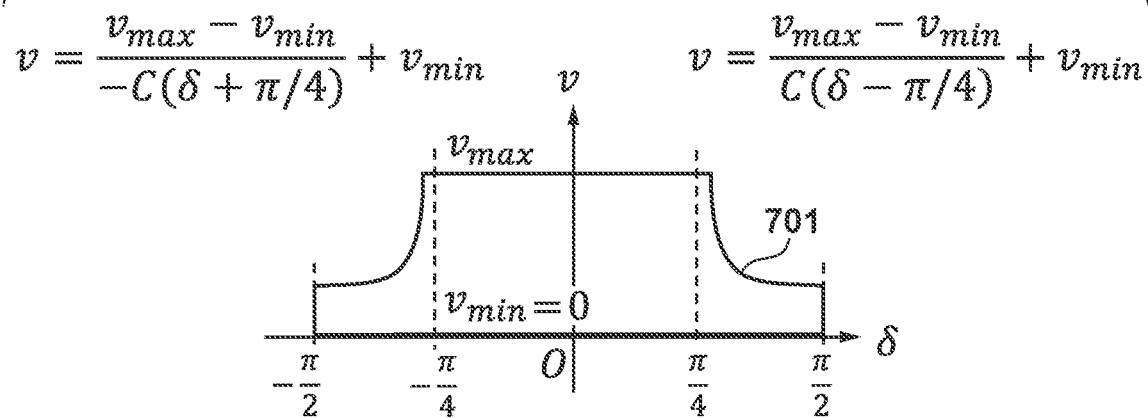
FIGS. 7A and 7B are views illustrating a constraint condition regarding a driven wheel of the moving object according to the embodiment.
Figure 7B:
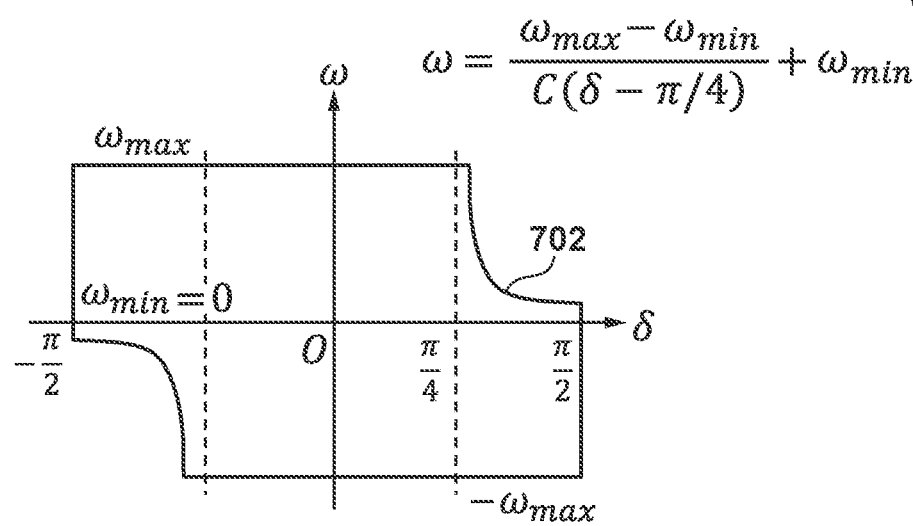

Furthermore, FIGS. 7A and 7B illustrate constraint conditions of the velocity v and the angular velocity ω set for the moving object in the model of the moving object illustrated in FIG. 6. FIG. 7A illustrates a constraint condition on the angle δ of the driven wheel and the velocity v of the moving object. FIG. 7B illustrates a constraint condition on the angle δ of the driven wheel and the angular velocity ω of the moving object. The constraint conditions considering the angle δ of the driven wheel impart a constraint to reduce a deviation between a direction of the driven wheel and the advancing direction of the moving object. According to the constraint conditions illustrated in FIGS. 7A and 7B, the route generation unit 304 travels at a low velocity until the direction of the driven wheel approaches the advancing direction of the moving object 100.

In a constraint condition 701 of FIG. 7A, in a case where an absolute value of the angle δ formed by the angle of the driven wheel and the advancing direction of the moving object is larger than a predetermined value (for example, π/4), the magnitude of the velocity of the moving object is limited to a smaller value as the absolute value of the formed angle δ is closer to vertical. That is, the route generation unit 304 limits a value of v as the angle δ approaches π/2 and −π/2.

In a constraint condition 702 of FIG. 7B, in a case where the angle δ formed by the angle of the driven wheel and the advancing direction of the moving object is larger than a predetermined value (for example, π/4), a positive angular velocity of the moving object is limited to a smaller value as the formed angle approaches 90 degrees. On the other hand, a negative angular velocity of the moving object is not limited. On the contrary, as the formed angle approaches −90 degrees, the negative angular velocity of the moving object is limited to a smaller value, and the positive angular velocity is not limited. This means that the route generation unit 304 does not limit the magnitude of an angular velocity as long as the angular velocity is in a direction to reduce the deviation between the angle δ of the driven wheel and the advancing direction.

The route generation unit 304 determines combinations of the velocity and the angular velocity that satisfy all the above-described constraint conditions (constraints described with reference to FIGS. 5, 7A, and 7B) of the velocity and the angular velocity of the moving object, and generates trajectories for the respective combinations. Next, the route generation unit 304 puts the generated plurality of trajectories into the cost function. The cost function is expressed as Formula (2). Here, $C_{error}$ represents a deviation cost from the global route given in advance, $C_{velocity}$ represents a following cost to a target velocity, and $C_{obstacle}$ represents an approach and collision cost with an obstacle. The deviation cost from the global route is configured such that the cost decreases as a difference (gap) between a generated trajectory and the global route is smaller. The approach and collision cost with an obstacle is configured such that the cost increases as a distance from a non-travelable region (obstacle) is shorter, for example, by projecting a trajectory onto a grid map. The route generation unit 304 selects the velocity v and the angular velocity ω that minimize the cost function according to Formula (3). In this manner, the route generation unit 304 can generate the traveling trajectory of the moving object 100 while appropriately considering the angle of the driven wheel in the generation of the traveling trajectory using the DWA.

[Expression 2]

$$C_{(v,\omega)} = \alpha C_{error} + \beta C_{velocity} + \gamma C_{obstacle} \quad (2)$$

[Expression 3]

$$v, \omega = \arg\min C_{(v,\omega)} \quad (3)$$

Note that an example in which the traveling trajectory is generated according to Formula (2) with reference to the global route created in advance for the target position has been described in the above example. The global route is a route for heading toward the target position that is longer than the trajectory (that is, the local route) generated according to Formula (2). By referring to the global route, the route generation unit 304 can generate the trajectory in the vicinity of the vehicle while avoiding the obstacle in consideration of a movement of the vehicle (using the DWA) along the route roughly determined to the target position. However, it is not essential to provide the global route, and $C_{error}$ is not necessarily used in Formula (2) as long as the target position can be considered separately.

The route generation unit 304 may consider a more optimal traveling trajectory for the generated traveling trajectory using, for example, a cost grid. The cost grid may be configured with the same number of grids as the grid map. Each grid of the cost grid is associated with a cost value. A plurality of the cost grids can be used, and the plurality of cost grids can be added by, for example, integrating values of corresponding grids. In the cost grid that handles a difference from the global route, for example, when the global route is projected onto a grid plane, a lower cost value is set for a grid closer to the global route. Further, in the cost grid that handles the approach and collision cost with an obstacle, a higher cost is set for each grid of the cost grid as the grid is closer to the obstacle. The route generation unit 304 stores the set cost grid in the memory device, and when a candidate trajectory is generated, projects the candidate trajectory to the cost grid and adds cost values of grids overlapping with a traveling route. For example, the route generation unit 304 determines an initial trajectory that satisfies the above-described constraint conditions, and determines the overlap between the initial trajectory and the cost grid to calculate a cost of the initial trajectory. Next, the route generation unit 304 calculates an updated trajectory so as to lower the cost (for example, using a gradient of the cost grid) while satisfying the constraint conditions. The route generation unit 304 projects the updated trajectory onto the cost grid and determines the overlap with the cost grid. By repeating such processing, the optimal trajectory can be obtained by relatively simple operation of projecting the trajectory onto the cost grid.

<Series of Operations of Trajectory Generation Processing in Moving Object 100>

Figure 8:
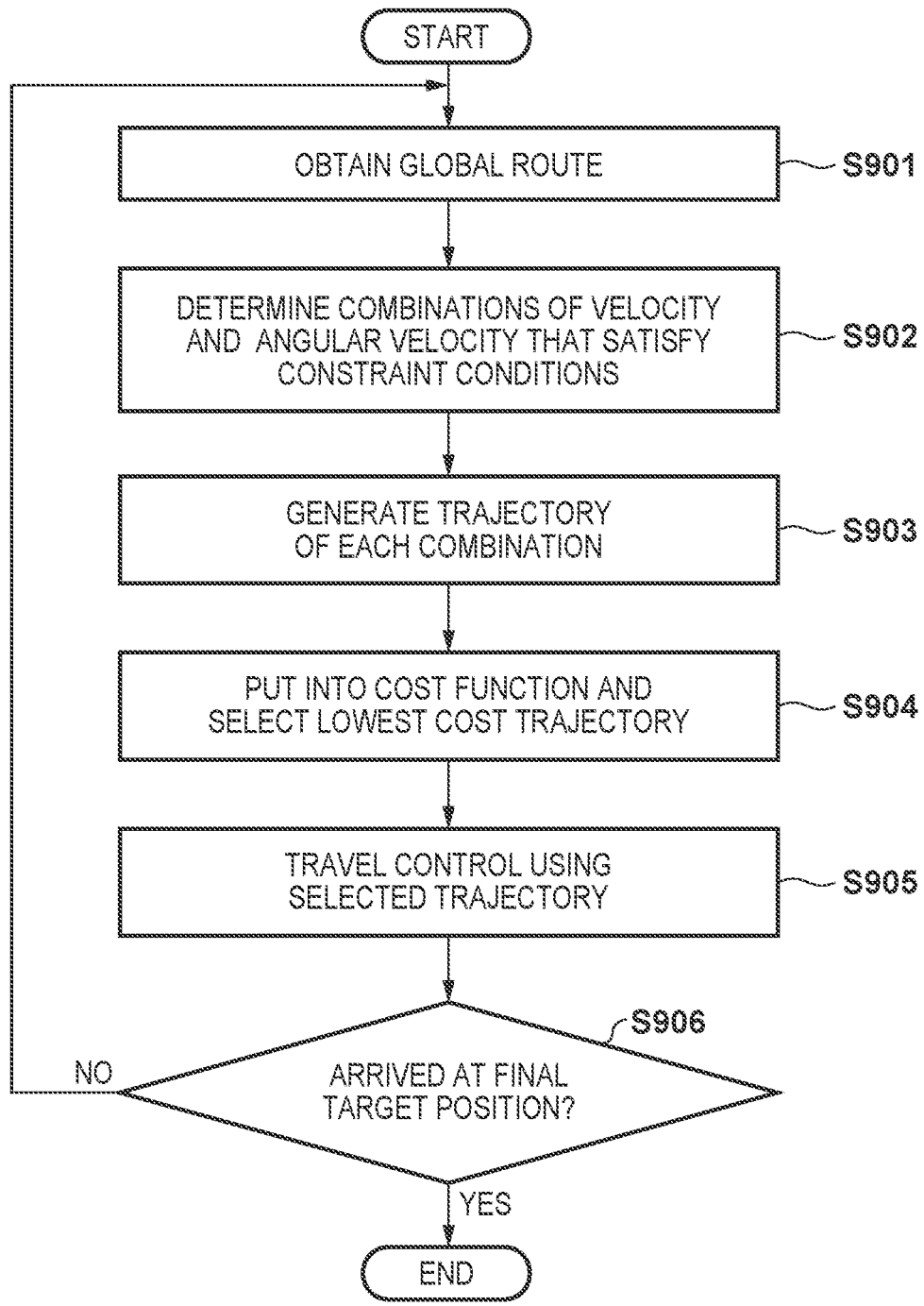
FIG. 8 is a flowchart illustrating a series of operations of trajectory generation processing according to the embodiment.

Next, a series of operations of the trajectory generation processing in the moving object 100 will be described with reference to FIG. 8. Note that the present processing is achieved as the control unit 130 develops a program stored in the storage device 135 in the memory device of the control unit 130 and executes the program. It is assumed that a grid map and a global route have been generated by another processing and stored in the memory device at a time point when this processing starts. The grid map and the global route in the memory device are updated at a predetermined timing by another processing executed in parallel. Further, it is assumed that a final target position is set according to a user instruction or the like.

In S901, the route generation unit 304 of the control unit 130 obtains the global route stored in the memory device. In S902, the route generation unit 304 determines combinations of a velocity and an angular velocity that satisfy constraint conditions. The constraint conditions include the obstacle window 502, the velocity constraint window 503, the acceleration constraint window 504, and the constraint conditions 701 and 702 regarding the driven wheel described with reference to FIGS. 5, 7A, and 7B.

In S903, the route generation unit 304 generates trajectories for the respective combinations of the velocity and the angular velocity. In S904, the route generation unit 304 puts the generated trajectories into a cost function. Then, a trajectory with the lowest cost of the cost function is selected. The route generation unit 304 calculates the cost of the trajectory using, for example, the above-described Formula (2) as the cost function. Furthermore, the route generation unit 304 selects the trajectory with the lowest cost (the velocity and the angular velocity of the moving object 100) according to Formula (3). The route generation unit 304 may select the trajectory with the low cost by optimizing curvatures of, for example, three points on a traveling trajectory obtained by combining a plurality of arc trajectories. Further, the route generation unit 304 may select the trajectory with low cost using the above-described cost grid.

In S905, a traveling control unit 305 controls traveling of the moving object 100 according to the selected trajectory. In S906, the control unit 130 determines whether the moving object 100 has arrived at the final target position. The control unit 130 determines whether the moving object 100 has arrived at the final target position. In a case where the control unit 130 determines that the moving object 100 has arrived at the final target position, this series of processing is ended, and otherwise, the processing returns to S901.

As described above, in the moving object including the drive wheel and the driven wheel in the above-described embodiment, the trajectory along which the moving object travels is generated based on the target position and the trajectory that can be generated from the velocity and angular velocity of the moving object that satisfy a predetermined constraint condition. At this time, the predetermined constraint condition includes a constraint on the velocity and angular velocity of the moving object determined from the velocity at which the moving object can travel, a constraint on the velocity and angular velocity of the moving object determined from the acceleration at which the moving object can accelerate, and a constraint on the velocity and angular velocity of the moving object depending on the angle of the driven wheel. In this manner, it is possible to generate the traveling trajectory of the moving object having the drive wheel and the driven wheel while appropriately considering the angle of the driven wheel.

Note that the configuration of the above-described control unit 130 may function in various forms as a moving object control system. For example, the moving object control system may be configured in a form in which at least a part of the above-described control unit 130 is configured on a device outside the moving object 100, for example, an external server. Alternatively, the moving object control system may be the moving object 100. Furthermore, a computer program for operating the above-described moving object 100 may be a computer program for causing one or more computers to function as each unit of the moving object control system. Furthermore, the moving object control system may be the control unit 130.

<Summary of Embodiment>

1. In a moving object control system that controls an operation of a moving object (for example, 100) including a drive wheel (for example, 120) and a driven wheel (for example, 121) in the above embodiment, the moving object control system comprises:
   a generation unit (for example, 304) configured to generate a trajectory along which the moving object travels based on a target position and trajectories that are generatable from velocities and angular velocities of the moving object that satisfy a predetermined constraint condition; and
   a control unit (for example, 305) configured to control traveling of the moving object in accordance with the generated trajectory,
   wherein the predetermined constraint condition includes a constraint determined from a travelable velocity of the moving object, a constraint determined from an acceleration at which the moving object is capable of accelerating, and a constraint depending on an angle of the driven wheel.

According to this embodiment, it is possible to generate the traveling trajectory of the moving object having the drive wheel and the driven wheel while appropriately considering the angle of the driven wheel.

2. In the moving object control system in the above embodiment, when an absolute value of an angle formed by the angle of the driven wheel and an advancing direction of the moving object is larger than a predetermined value, the predetermined constraint condition is set in such a manner that a magnitude of a velocity of the moving object is limited to a smaller value as the absolute value of the formed angle is closer to vertical.

According to this embodiment, it is possible to generate the traveling trajectory of the moving object in which the appropriate velocity is set in accordance with the angle of the driven wheel.

3. In the moving object control system in the above embodiment, when an angle formed by the angle of the driven wheel and an advancing direction of the moving object is larger than a predetermined value, the predetermined constraint condition is set in such a manner that a positive angular velocity of the moving object is limited to a smaller value as the formed angle is closer to vertical but a negative angular velocity of the moving object is not limited.

According to this embodiment, it is possible to generate the traveling trajectory of the moving object in which the appropriate angular velocity of the moving object is set in accordance with the angle of the driven wheel.

4. In the moving object control system in the above embodiment, the predetermined constraint condition further includes a constraint for preventing the moving object from colliding with an obstacle.

According to this embodiment, it is possible to generate the traveling trajectory of the moving object that avoids the collision with the obstacle.

5. In the moving object control system in the above embodiment, the generation unit generates, as the trajectory along which the moving object travels, a trajectory closest to the target position from among the trajectories that are generatable from the velocities and the angular velocities of the moving object that satisfy the predetermined constraint condition.

According to this embodiment, the shortest route to the target position can be generated as the traveling trajectory in consideration of the angle of the driven wheel.

6. In the moving object control system in the embodiment, the moving object control system further comprises an estimation unit configured to estimate the angle of the driven wheel based on a velocity of the moving object, an angular velocity of the moving object, and a distance of the driven wheel from an axle of the drive wheel.

According to this embodiment, the angle of the driven wheel can be acquired without using the additional sensor.

7. In the moving object control system in the above embodiment, the target position is a point on a global route acquired in advance, the global route having a longer distance than the trajectory generated by the generation unit.

According to this embodiment, the route that does not leave the global route can be generated.

8. In the moving object control system in the above embodiment, the constraint condition includes a constraint on a velocity and an angular velocity of the moving object determined from the travelable velocity of the moving object, a constraint on a velocity and an angular velocity of the moving object determined from the acceleration at which the moving object is capable of accelerating, and a constraint on a velocity and an angular velocity of the moving object depending on the angle of the driven wheel.

According to this embodiment, it is possible to provide the appropriate velocity and angular velocity of the moving object for the traveling of the moving object.

9. In the moving object control system in the above embodiment, the constraint for preventing the moving object from colliding with the obstacle includes a constraint on a velocity and an angular velocity of the moving object for preventing the moving object from colliding with the obstacle.

According to this embodiment, it is possible to provide the appropriate velocity and angular velocity of the moving object in consideration of the obstacle.

10. In the moving object control system in the above embodiment, the generation unit generates, as the trajectory along which the moving object travels, a trajectory that minimizes a cost of a predetermined cost function from among the trajectories that are generatable from the velocities and the angular velocities of the moving object that satisfy the predetermined constraint condition.

According to this embodiment, it is possible to generate the optimized trajectory in consideration of various restraints from among the velocities and the angular velocities of the moving object that satisfy the constraint condition.

11. In the moving object control system in the above embodiment, the predetermined cost function makes the cost lower as a difference between the generated trajectory and the global route decreases.

According to this embodiment, the traveling trajectory along the given global route can be generated.

12. In the moving object control system in the above embodiment, the predetermined cost function makes the cost lower as a difference between the generated trajectory and a trajectory generated at an immediately previous time decreases.

According to this embodiment, it is possible to suppress an abrupt change in the trajectory.

13. In the moving object control system in the above embodiment, the predetermined cost function makes the cost higher as a distance to an obstacle in the generated trajectory decreases.

According to this embodiment, it is possible to generate the traveling trajectory with a mitigated risk of collision with the obstacle.

14. In the moving object control system in the above embodiment, the moving object is a micro mobility vehicle that allows riding of a person.

According to this embodiment, it is possible to generate the traveling trajectory of the moving object having the drive wheel and the driven wheel while appropriately considering the angle of the driven wheel in the micro mobility vehicle.

15. In the moving object control system in the above embodiment, the moving object control system is a moving object including the generation unit and the control unit.

According to this embodiment, the moving object control system is provided as the moving object.

The invention is not limited to the foregoing embodiments, and various variations/changes are possible within the spirit of the invention.

What is claimed is:

1. A moving object control system that controls an operation of a moving object including a drive wheel and a driven wheel, the moving object control system comprising:
at least one processor circuit with a memory comprising instructions that, when executed by the at least one processor circuit, cause the at least one processor circuit to at least:
generate a trajectory along which the moving object travels based on a target position and a plurality of possible trajectories that are generatable from velocities and angular velocities of the moving object that satisfy a predetermined constraint condition; and
control traveling of the moving object in accordance with the generated trajectory,
wherein the predetermined constraint condition includes a constraint on a velocity and an angular velocity of the moving object determined from a travelable velocity of the moving object, a constraint on a velocity and an angular velocity of the moving object determined from an acceleration at which the moving object is capable of accelerating, and a constraint on a velocity and an angular velocity of the moving object depending on an angle of the driven wheel.

2. The moving object control system according to claim 1, wherein, when an absolute value of an angle formed by the angle of the driven wheel and an advancing direction of the moving object is larger than a predetermined value, the predetermined constraint condition is set in such a manner that a magnitude of a velocity of the moving object is limited to a smaller value as the absolute value of the formed angle is closer to vertical.

3. The moving object control system according to claim 1, wherein, when an angle formed by the angle of the driven wheel and an advancing direction of the moving object is larger than a predetermined value, the predetermined constraint condition is set in such a manner that a positive angular velocity of the moving object is limited to a smaller value as the formed angle is closer to vertical but a negative angular velocity of the moving object is not limited.

4. The moving object control system according to claim 1, wherein the predetermined constraint condition further includes a constraint for preventing the moving object from colliding with an obstacle.

5. The moving object control system according to claim 4, wherein the constraint for preventing the moving object from colliding with the obstacle includes a constraint on a velocity and an angular velocity of the moving object for preventing the moving object from colliding with the obstacle.

6. The moving object control system according to claim 1, wherein the generated trajectory along which the moving object travels is closest to the target position from among the possible trajectories that are generatable from the velocities and the angular velocities of the moving object that satisfy the predetermined constraint condition.

7. The moving object control system according to claim 1, wherein the instructions, when executed by the at least one processor circuit, further cause the at least one processor circuit to at least estimate the angle of the driven wheel based on a velocity of the moving object, an angular velocity of the moving object, and a distance of the driven wheel from an axle of the drive wheel.

8. The moving object control system according to claim 1, wherein the target position is a point on a global route acquired in advance, the global route having a longer distance than the generated trajectory.

9. The moving object control system according to claim 8, wherein the generated trajectory along which the moving object travels minimizes a cost of a predetermined cost function from among the trajectories that are generatable from the velocities and the angular velocities of the moving object that satisfy the predetermined constraint condition.

10. The moving object control system according to claim 9, wherein the predetermined cost function makes the cost lower as a difference between the generated trajectory and the global route decreases.

11. The moving object control system according to claim 9, wherein the predetermined cost function makes the cost lower as a difference between the generated trajectory and a trajectory generated at an immediately previous time decreases.

12. The moving object control system according to claim 9, wherein the predetermined cost function makes the cost higher as a distance to an obstacle in the generated trajectory decreases.

13. The moving object control system according to claim 1, wherein the moving object is a micro mobility vehicle that allows riding of a person.

14. A moving object comprising the moving object control system according to claim 1.

15. A control method for a moving object control system that controls an operation of a moving object including a drive wheel and a driven wheel, the control method comprising:

generating a trajectory along which the moving object travels based on a target position and a plurality of possible trajectories that are generatable from velocities and angular velocities of the moving object that satisfy a predetermined constraint condition; and controlling traveling of the moving object in accordance with the generated trajectory, wherein the predetermined constraint condition includes a constraint on a velocity and an angular velocity of the moving object determined from a travelable velocity of the moving object, a constraint on a velocity and an angular velocity of the moving object determined from an acceleration at which the moving object is capable of accelerating, and a constraint on a velocity and an angular velocity of the moving object depending on an angle of the driven wheel.

16. A non-transitory recording medium storing a program for causing a computer to function as a moving object control system that controls an operation of a moving object including a drive wheel and a driven wheel, comprising:

generating a trajectory along which the moving object travels based on a target position and a plurality of possible trajectories that are generatable from velocities and angular velocities of the moving object that satisfy a predetermined constraint condition; and controlling traveling of the moving object in accordance with the generated trajectory, wherein the predetermined constraint condition includes a constraint on a velocity and an angular velocity of the moving object determined from a travelable velocity of the moving object, a constraint on a velocity and an angular velocity of the moving object determined from an acceleration at which the moving object is capable of accelerating, and a constraint on a velocity and an angular velocity of the moving object depending on an angle of the driven wheel.

* * * * *